United States Patent
Hwang (10) Patent No.: US 9,281,010 B2
(45) Date of Patent: Mar. 8, 2016

(54) TIMELINE-BASED CONTENT CONTROL METHOD AND APPARATUS USING DYNAMIC DISTORTION OF TIMELINE BAR, AND METHOD AND APPARATUS FOR CONTROLLING VIDEO AND AUDIO CLIPS USING THE SAME

(75) Inventor: Sung-Jae Hwang, Daejeon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 136 days.

(21) Appl. No.: 13/483,405

(22) Filed: May 30, 2012

(65) Prior Publication Data

US 2012/0306925 A1      Dec. 6, 2012

(30) Foreign Application Priority Data

May 31, 2011   (KR) .................. 10-2011-0052005
Aug. 31, 2011   (KR) .................. 10-2011-0087883

(51) Int. Cl.
| | |
|---|---|
| G09G 5/26 | (2006.01) |
| G11B 27/00 | (2006.01) |
| G06F 3/0488 | (2013.01) |
| G11B 27/34 | (2006.01) |
| G06F 3/0485 | (2013.01) |
| G11B 27/10 | (2006.01) |

(52) U.S. Cl.
CPC .......... *G11B 27/005* (2013.01); *G06F 3/0488* (2013.01); *G06F 3/04855* (2013.01); *G11B 27/10* (2013.01); *G11B 27/34* (2013.01)

(58) Field of Classification Search
CPC ............ G09G 5/24; G09G 5/00; G09G 5/34; G09G 1/00; G09G 2320/0673; G09G 5/02; G09G 5/26; G06F 3/04883; G06F 3/0488; G06F 3/04855; G06F 3/0485; G06T 2207/30204; G06T 7/0042; G06T 3/00; G06T 5/006; G06T 11/00; G06T 11/206; G06T 11/60; G06T 15/205; G06T 2207/10116; G06T 2207/30004; G06T 5/009; G06T 5/40; G06T 7/0012; G06T 7/0075; G11B 27/34; G11B 27/005; G11B 27/10; Y10S 15/973
USPC ....................................................... 345/647
See application file for complete search history.

(56) References Cited

U.S. PATENT DOCUMENTS

| | | | | |
|---|---|---|---|---|
| 4,790,028 | A * | 12/1988 | Ramage | 382/298 |
| 7,062,713 | B2 | 6/2006 | Schriever et al. | |
| 8,612,885 | B2 * | 12/2013 | Kim | 715/808 |
| 2006/0022955 | A1 | 2/2006 | Kennedy | |

(Continued)

FOREIGN PATENT DOCUMENTS

| | | |
|---|---|---|
| CN | 101611373 A | 12/2009 |
| CN | 101842768 A | 9/2010 |

(Continued)

*Primary Examiner* — Kee M Tung
*Assistant Examiner* — Yuehan Wang
(74) *Attorney, Agent, or Firm* — Cha & Reiter, LLC.

(57) ABSTRACT

A method and apparatus for controlling content based on a timeline in a timeline-based content control apparatus with a touch screen. The method includes generating and displaying a linear timeline bar on the touch screen regardless of the size of content; detecting contact on the timeline bar; nonlinearly distorting a predetermined section of the timeline bar being displayed around the touch-detected position on the timeline bar; and performing a fine search and shifting the distorted section depending on a direction of the user's touch.

20 Claims, 9 Drawing Sheets

(56) References Cited

U.S. PATENT DOCUMENTS

| | | | |
|---|---|---|---|
| 2006/0026535 A1* | 2/2006 | Hotelling et al. | 715/863 |
| 2008/0141165 A1* | 6/2008 | Feig et al. | 715/786 |
| 2008/0165141 A1 | 7/2008 | Christie | |
| 2008/0307345 A1 | 12/2008 | Hart et al. | |
| 2009/0288032 A1* | 11/2009 | Chang et al. | 715/776 |
| 2010/0039400 A1* | 2/2010 | Jang | 345/173 |
| 2010/0281367 A1* | 11/2010 | Langmacher et al. | 715/716 |
| 2011/0090255 A1* | 4/2011 | Wilson et al. | 345/647 |
| 2011/0163969 A1* | 7/2011 | Anzures et al. | 345/173 |
| 2011/0193787 A1* | 8/2011 | Morishige et al. | 345/173 |
| 2012/0026194 A1* | 2/2012 | Wagner et al. | 345/647 |
| 2012/0032979 A1* | 2/2012 | Blow et al. | 345/647 |
| 2012/0151401 A1 | 6/2012 | Hwang | |
| 2012/0297335 A1* | 11/2012 | Ramasubramanian et al. | 715/787 |

FOREIGN PATENT DOCUMENTS

| | | |
|---|---|---|
| KR | 10-2007-0101336 A | 10/2007 |
| KR | 10-0867401 B1 | 11/2008 |
| KR | 10-2010-0020311 A | 2/2010 |
| KR | 10-2011-0010935 A | 2/2011 |
| KR | 10-2011-0117335 A | 10/2011 |
| KR | 10-2012-0066122 A | 6/2012 |

* cited by examiner

TIME

TIMELINE-BASED CONTENT CONTROL METHOD AND APPARATUS USING DYNAMIC DISTORTION OF TIMELINE BAR, AND METHOD AND APPARATUS FOR CONTROLLING VIDEO AND AUDIO CLIPS USING THE SAME

CLAIM OF PRIORITY

This application claims the benefit of priority under 35 U.S.C. §119(a) from a Korean Patent Applications Serial No. 10-2011-0052005 filed in the Korean Intellectual Property Office (KIPO) on May 31, 2011 and Serial No. 10-2011-0087883 filed in KIPO on Aug. 31, 2011, the entire disclosures of which are both incorporated herein by reference in their entirety.

BACKGROUND OF THE INVENTION

1. Field of the Invention

The present invention relates to apparatuses and methods for a timeline-based content control method and apparatus using a nonlinear timeline bar. More particularly, the present invention relates to a method and apparatus for controlling video and audio clips using the non-linear timeline bar.

2. Description of the Related Art

Touch screens or touch panels refer to a user interface device for detecting a tactile-sensed position where a user has touches a displayed character or a specific point displayed on a screen capable of sensing touch by an input means such as a user's fingertip and/or a touch pen without using a keyboard, and then handling a specific event corresponding thereto using stored software. In most cases, the user interface device senses a user's fingertip as an input means, causing low-touch accuracy due to the large user's fingertip. Hardware solutions such as stylus pens have been proposed as a way of solving the problems associated with inaccurate finger touch on the touchscreen display. However, the use of a styles has disadvantages in that user often separately purchases the stylus pen, which may be subsequently inadvertently lost. Also, the use of a stylus often requires use of both hands to manipulate the user interface device with it.

Figure 1:
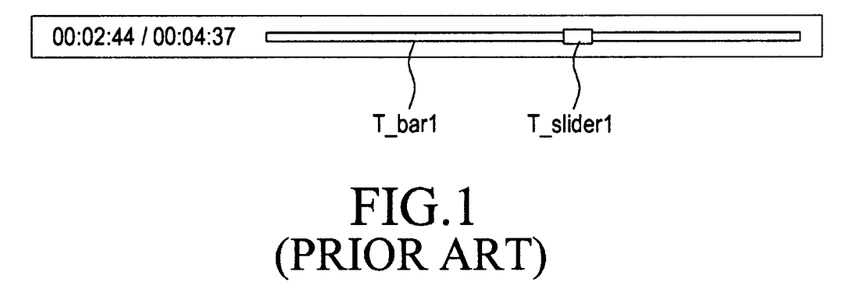
FIG. 1 shows an example of a timeline bar according to the prior art.

FIG. 1 shows an example of a timeline bar according to the prior art.

Referring now to FIG. 1, a timeline bar T_bar1 is displayed as a linear (or straight) line corresponding to the full size of content such as video and audio. The timeline bar T_bar1 includes a timeline slider T_slider1 indicating a specific portion of the content, which is actually being played on a screen.

In reality, the timeline bar T_bar1 according to the prior art is displayed as one side of a screen frame, or a linear line in a specific area of the screen frame. In this case, the amount of content, which corresponds to a specific length of the timeline bar T_bar1, is actually fixed. In this touch environment, a user may not finely or precisely manipulate the timeline slider T_slider1 with his or her fingertip because of the large size of the fingertip.

Figure 2:
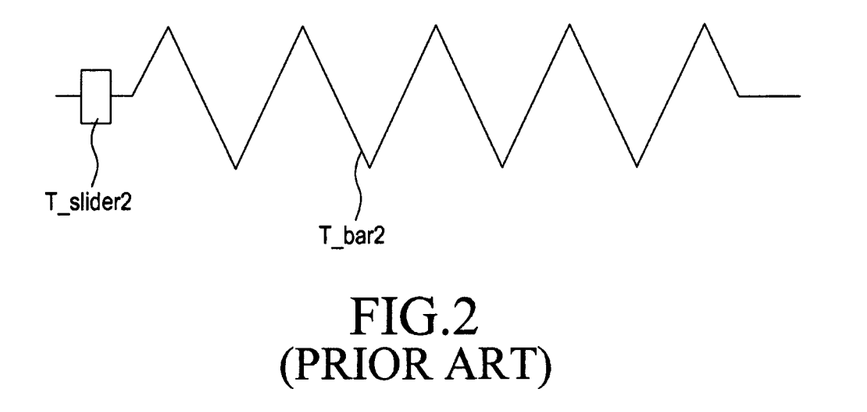
FIG. 2 shows another example of a timeline bar according to the prior art.

FIG. 2 shows another example of a timeline bar according to the prior art. Shown in FIG. 2 is a timeline bar disclosed in Korean Patent Publication No. 10-2011-0010935, filed on Jul. 27, 2009, invented by the inventors of this application. In FIG. 2, a timeline bar T_bar2 is formed in a nonlinear pattern to solve the problems of the timeline bar T_bar1 shown in FIG. 1. If the timeline bar T_bar2 is formed nonlinearly as shown in FIG. 2, the nonlinear timeline bar T_bar2 is longer in length than the linear timeline bar T_bar1, so the user may finely manipulate a timeline slider T_slider2 with ease, contributing to the improvement in convenience of content manipulation and enabling fine manipulation.

However, the timeline bar T_bar2 in FIG. 2 may be the same as the timeline bar T_bar1 in FIG. 1 in that the amount of content, which corresponds to a specific length of the timeline bar T_bar2, is fixed. In other words, the user may not select a fineness of the timeline bar T_bar2, because he or she may not adjust the length of the timeline bar T_bar2. In addition, since the pattern of the timeline bar T_bar2 in FIG. 2 is more complex than that of the simple linear timeline bar T_bar1, the user may not immediately determine the current position of the timeline slider T_slider2 due to its unfamiliar pattern, when he or she merely wants to check the current position of the timeline slider T_slider2.

Other attempted solutions to deal with touch accuracy include the development of "Rewind" and Fast Forward" buttons that have been proposed as possible software solutions to the problems stated above. Even in the case of using such buttons, the user may not shift a timeline slider to his/her desired position on a timeline bar in real time, though he or she may shift the timeline slider fast.

Therefore, there is a need in the art for a solution to the use of timeline bars, particularly with audio and video clips, unknown heretofore.

SUMMARY OF THE INVENTION

To address at least some of the above-discussed problems, the present invention provides a timeline bar in which a specific section is dynamically distorted.

An aspect of exemplary embodiments of the present invention is to provide a timeline-based content control method for allowing a user to perform fine manipulation with a low-resolution fingertip, and a variety of application methods using the same.

In a number of exemplary aspects of the present invention, there is provided a timeline-based content control method and apparatus using a nonlinear timeline bar, for allowing a user to perform fine manipulation with a low-resolution fingertip on small devices such as mobile devices, or large devices such as tabletop interfaces, and a method and apparatus for controlling video and audio clips.

Another aspect of exemplary embodiments of the present invention is to provide a timeline-based content control apparatus for allowing a user to perform fine manipulation with a low-resolution fingertip, and a variety of application devices using the same.

In accordance with one exemplary aspect of the present invention, there is provided a method for controlling content based on a timeline in a timeline-based content control apparatus having a touch screen. The method includes generating and displaying a linear timeline bar on the touch screen regardless of the size of content; detecting a user's touch on the timeline bar; nonlinearly distorting a predetermined section of the timeline bar around the touch-detected position on the timeline bar; and performing a fine search and shifting the distorted section depending on a direction of the user's touch.

The nonlinearly distorting may include, for example, distorting the timeline bar in a form of a curve in the predetermined section.

The nonlinearly distorting may include distorting at least a section of the timeline bar in a form of a plurality of broken lines in the predetermined section.

The nonlinearly distorting of a predetermined section of the display may include, for example, nonlinearly distorting a length section which is specified forward and backward in a direction of the linear timeline bar at around the touch-detected position.

The nonlinearly distorting of a predetermined section of the display may include, for example, nonlinearly distorting a time section which is specified forward and/or backward in a direction of the linear timeline bar at around the touch-detected position.

The nonlinearly distorting of a predetermined section of the display may include, for example, nonlinearly distorting a predetermined section when the user's touch lasts (i.e. remains) on the touchscreen at the same position for a predetermined time or more.

The nonlinearly distorting of a predetermined section of the display may include, for example, increasing a size or prominence of the nonlinearly distorted section on the linear timeline bar depending on a time for which the user's touch remains on the touchscreen at the same position of the touch screen.

The nonlinearly distorting of a predetermined section of the display may include, for example, varying a range of the nonlinearly distorted section and a strength (i.e. an amount or degree) of the distortion depending on a corresponding or particular time in which the user's touch (detected touch or contact) remains at the same position of the touch screen.

The nonlinearly distorting may include, for example, varying a range of the nonlinearly distorted section and a strength of the distortion on the linear timeline bar depending on a corresponding or particular time for which the user's touch remains at the same position of the touch screen.

The nonlinearly distorting of a predetermined section of the display may include nonlinearly distorting a predetermined section on the linear timeline bar if a predetermined event trigger occurs.

The event trigger for nonlinear distortion may occur when the user's touch occurs with a predetermined pressure or more, when the user makes a specific gesture, or when the user makes a double touch on substantially the same position.

The nonlinearly distorting of a predetermined section of the display may include varying a strength of the nonlinear distortion depending on a size of content, which corresponds to a length of the linear timeline bar.

The performing a fine search and shifting of the distorted section of the display may include determining whether the user's touch is shifted or shifts in the same direction as a direction of the linear timeline bar; searching for a position of a media clip corresponding to the user-touched position in the distorted section, if the user's touch is shifted in a direction different from the direction of the linear timeline bar; and shifting the distorted section in a shift direction of the user's touch, if the user's touch is shifted in the same direction as the direction of the linear timeline bar.

In an example of one aspect of the present invention, a method for controlling an output of content based on a timeline in a timeline-based content control apparatus with a touch screen, comprises generating by a controller and displaying by a touch screen a linear timeline bar on the touch screen regardless of a size or duration of an output of a content; detecting by the controller a touch on the timeline bar; nonlinearly distorting by a distortion generator a predetermined section of the timeline bar being displayed by the display screen, the predetermined section including the touch-detected position on the timeline bar; and performing by the controller a fine search for a particular position within the content corresponding to the touch position in the distorted section or shifting the distorted section depending on a sliding direction of the detected touch.

In another example of the present invention, a timeline-based content control apparatus comprises: a touch screen; a controller that generates for display by the touch screen a linear timeline bar on the touch screen regardless of a size or duration of content; the touchscreen detects a touch on a surface displaying the timeline bar; a distortion generator for nonlinearly distorting a predetermined section of the displayed timeline bar around a predetermined area of the touch-detected position on the timeline bar; the controller configured for control a display of the timeline bar by the touchscreen and for changing a display of a distorted section on the timeline bar or shifting a timeline slider depending a sensed selection gesture corresponding to the shape of the timeline bar; and a command unit performs a fine search and/or shifts display of the distorted section depending on a sensed direction of a sliding contact on the touchscreen.

BRIEF DESCRIPTION OF THE DRAWINGS

The above and other exemplary aspects, features and advantages of certain exemplary embodiments of the present invention will become more apparent to the person of ordinary skill in the art from the following description taken in conjunction with the accompanying drawings, in which.

Throughout the drawings, the same drawing reference numerals will be understood to refer to the same or similar elements, features and structures.

DETAILED DESCRIPTION

Preferred exemplary embodiments of the present invention will now be described in detail with reference to the accompanying drawings. In the following description, specific details such as detailed configurations and components are merely provided to assist the person of ordinary skill in the art with an overall understanding of the exemplary embodiments of the present invention. Therefore, a person of ordinary skill in the art should appreciate that various changes and modifications of the exemplary embodiments described herein can be made without departing from the scope and spirit of the invention, as defined by the appended claims. In addition, descriptions of well-known functions and constructions may be omitted for clarity and conciseness when their inclusion might obscure appreciation of the subject matter of the present invention by an artisan.

The term 'timeline' as used herein may refer to an editable program workspace on which content or consecutive data, such as video and audio clips, is placed in an order or sequence. The timeline typically includes layers and frames, and a moving animation or music may be created by placing screen videos and/or audios through a combination of the layers. Basically, as for a function capable of showing frames in sequence by adjusting object's position, size, image properties, etc., it may effectively edit and manage content components by registering and managing related components on different layers.

Figure 3:
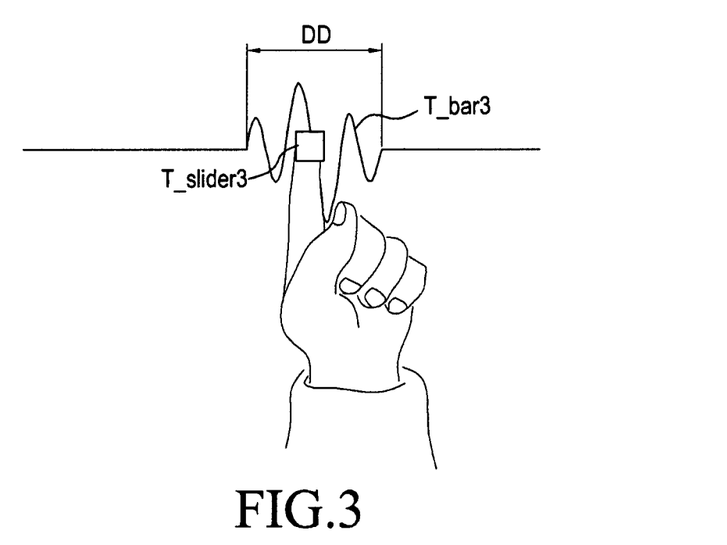
FIG. 3 shows a timeline bar according to an exemplary embodiment of the present invention.

FIG. 3 shows a timeline bar according to an exemplary embodiment of the present invention.

The expression "dynamic distortion of a timeline bar T_bar3" as used herein may refer to distorting the shape of a display of a linear timeline bar into a nonlinear timeline bar. For example, in an exemplary embodiment of the present invention, the nonlinear distortion may correspond to at least one of curved distortion including one or more curves, broken-line distortion in which a plurality of broken linear timeline bars are connected at a specific angle which is not an angle of 180°, and composite distortion which is a combination of the curved distortion and the broken-line distortion. In addition to these nonlinear distortions, all the other possible nonlinear distortions of the timeline fall within the spirit and scope of the claimed invention.

Although it will be assumed herein for the purposes of explanation and illustration that the content preferably includes video and/or audio clips by way of example, but the artisan must appreciate that the present invention is not limited thereto. In some cases, the content may include a set of content, such as a collection of photos.

In FIG. 3, a displayed timeline bar T_bar3 is distorted in the form of a zigzag curve in a section DD (e.g., −1 cm~1 cm) which is specified forward (e.g., right) and backward (e.g., left) at around a user-touched position. The left/right-specified section DD may be specified as a length on the timeline bar T_bar3, or may be specified as a predetermined time (e.g., −1 minute~+1 minute) at around the time corresponding to the user-touched position. The section DD, which is specified forward and backward at an area around, for example, a perimeter of the user-touched position represents a position in a direction of the timeline bar T_bar3. In FIG. 3, the timeline bar T_bar3 may be represented right and left (instead of forward and backward), because the timeline bar T_bar3 is placed horizontally. The timeline bar T_bar3 may be represented in various different ways depending on its orientation. For example, up and down for a vertically represented timeline bar, or as desired, such as in a diagonal time line bar.

For example, in the case where the specified section is identified as a length on the timeline bar T_bar3, if the user touches a specific position on the timeline bar T_bar3, a timeline slider T_slider3 is shifted to the user-touched position, and the timeline bar T_bar3 may be distorted in the form of a zigzag curve right and left (e.g., forward and backward) by 1 cm (a total of 2 cm) at around the position of the shifted timeline slider T_slider3.

Similarly, in the case where the specified section is specified as a predetermined time at around the time corresponding to the user-touched position, if the user touches a specific position on the timeline bar T_bar3, the timeline slider T_slider3 is shifted to the user-touched position, and the timeline bar T_bar3 may be distorted in the form of a zigzag curve forward and backward (e.g., right and left) by 1 minute (a total of 2 minutes) at around the time of content, which corresponds to the position of the shifted timeline slider T_slider3.

In the present invention, the "user-touched position" refers to the position (i.e. area) of the display where the user's touch is detected, and it means the approximate area, not an exact point where the user's contact is made, because the user may not accurately touch a specific position on the timeline bar T_bar3 because of his or her large fingertip which is actually greater than the timeline bar T_bar3. In many cases, the position of the touch on the display screen may be detected as a specific area rather than a specific point, and as a method for determining the point corresponding to the user-touched area of the screen is well-known to the artisan, so a detailed description thereof will be omitted herein. The terms "substantially the same position" and "substantial position" as used herein may be understood from the same point of view.

The distorted section DD is preferably much longer in length than the section DD on the undistorted timeline bar T_bar3. Therefore, the user may freely and finely shift the timeline slider T_slider3 in the distorted section DD by touching and/or dragging a specific position on the timeline bar T_bar3 within the distorted section DD with his or her fingertip.

Figure 4A:
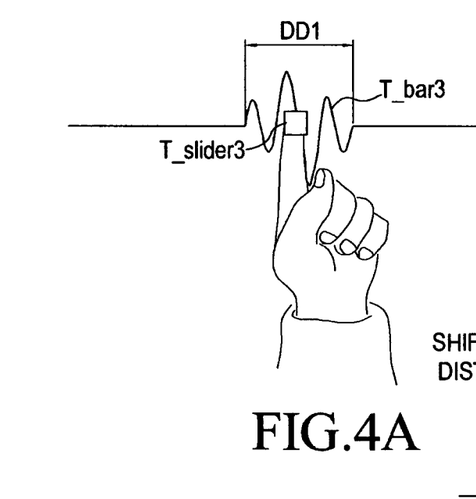
FIGS. 4A to 4C show shifts of a timeline slider on the timeline bar shown in FIG. 3 according to an exemplary embodiment of the present invention.
Figure 4B:
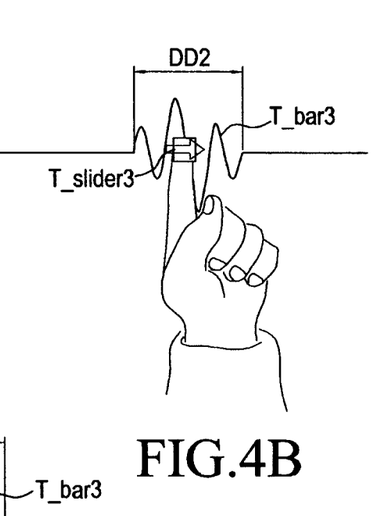
Figure 4C:
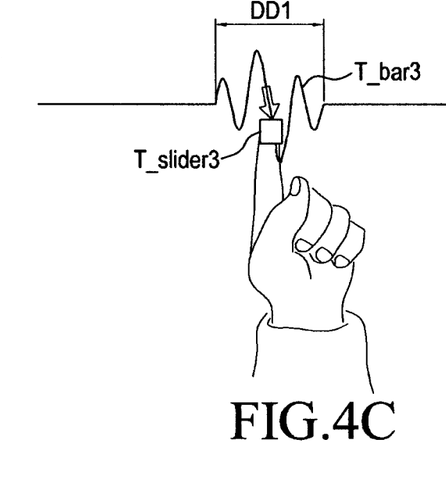

FIGS. 4A to 4C show some non-limiting examples of shifts of a timeline slider on the timeline bar shown in FIG. 3 according to an exemplary embodiment of the present invention.

For example, FIG. 4A shows a distorted section DD1 occurring on the timeline bar T_bar3 by the initial user's touch. FIG. 4B shows a shift of the timeline slider T_slider3 and a change in distorted section DD2 of the timeline bar T_bar3 when the user drags in the direction of the timeline bar T_bar3 after the occurrence of the distorted section DD1.

FIG. 4C shows a shift of the timeline slider T_slider3 when the user makes a drag in a direction different from the direction of the timeline bar T_bar3 after the occurrence of the distorted section DD1.

The user may desire to select another section DD2 other than the distorted section DD1 even after a specified section of the timeline bar T_bar3 is distorted as he or she touches a specific position on the timeline bar T_bar3. In other words, it is important to determine whether the user wants to select the distorted section DD1 or the undistorted section DD2 after the occurrence of distortion As a result, the present invention distorts the timeline bar T_bar3 in a nonlinear pattern only in the section around the position that the user selects on the timeline bar T_bar3 which is linear prior to being distorted, so the user may very finely select the play position of the content with ease by selecting a specific position on the distorted timeline bar T_bar3. As shown in FIG. 4C, if the user makes a drag or touch with his or her fingertip in a direction other than the original direction of the timeline bar T_bar3 after the distorted section DD1 is generated due to the user's touch, it is to shift the timeline slider T_slider3 to a position within the distorted section DD1. On the contrary, if the user makes a drag or touch with his or her fingertip in the original direction of the timeline bar T_bar3 as shown in FIG. 4B, it may be determined that the user wants to select a section DD2 other than the distorted section DD1.

Therefore, it is important to distinguish one case where the user selects the distorted section DD1 of the timeline bar T_bar3, from another case where the user selects the undistorted section DD2. To this end, in the presently claimed invention, the distorted section of the timeline bar T_bar3 should be different from the undistorted section of the timeline bar T_bar3 in terms of the direction.

For this purpose, as shown in FIGS. 4A to 4C, the pattern of the distorted section may be formed in a zigzag substantially perpendicular to the timeline bar T_bar3 that progresses horizontally. If the pattern of the timeline bar T_bar3 in the distorted section DD1 is set to be different from that in a section other than the distorted section DD1 in this way, it is possible to determine whether the user shifts the timeline slider T_slider3 within the distorted section DD1 or whether the user shifts the timeline slider T_slider3 to the section DD2 other than the distorted section DD1, along a touch or drag direction (i.e., along the user's gesture).

As a result, the present invention distorts the timeline bar T_bar3 in a nonlinear pattern only in the section around the position that the user selects on the timeline bar T_bar3 which is linear prior to being distorted, so the user may very finely select the play position of the content with ease by selecting a specific position on the distorted timeline bar T_bar3. As shown in FIG. 4C, if the user makes a drag or touch with his or her fingertip in a direction other than the original direction of the timeline bar T_bar3 after the distorted section DD1 is generated due to the user's touch, it is to shift the timeline slider T_slider3 to a position within the distorted section DD1. On the contrary, if the user makes a drag or touch with his or her fingertip in the original direction of the timeline bar T_bar3 as shown in FIG. 4B, it may be determined that the user wants to select a section DD2 other than the distorted section DD1.

The expression "a drag direction corresponds to a direction of the timeline bar T_bar3" as used herein does not mean that the drag direction is exactly the same as the direction of the timeline bar T_bar3, but means that the drag direction is substantially the same as the direction of the timeline bar T_bar3 within a predetermined error range. A non-limiting example of such a predetermined error range could be within a certain distance or an angle within five degrees of the horizontal line.

By determining whether or not the user selects the distorted section, the proposed timeline-based content control method and apparatus may perform a function of shifting the distorted section. In other words, if the user makes a drag or touch with his or her fingertip in the original direction of the timeline bar T_bar3 after the distorted section DD1 is generated, a distorted section DD2 varies (or is shifted) depending on the drag or touch position. For example, after the distorted section DD1 with a specified length is generated at around the position that is initially selected on the timeline bar T_bar3 by the user's touch, as the user makes a drag with his or her fingertip in the direction of the timeline bar T_bar3, the distorted section DD2 with a specified length may be generated again at around the position of the dragged fingertip. If the distorted section DD2 with a specified length is generated again at around the position of the dragged fingertip as the user makes a drag with his or her fingertip in the direction of the timeline bar T_bar3, the nonlinear timeline bar T_bar3 can make it possible to enable a fast search over the entire area of content, similar to the existing linear timeline bar T_bar1, and also enable a fine search in the distorted section DD2.

FIGS. 5A to 5E show an exemplary method of adjusting the strength of distortion and the range of a distorted section on the timeline bar shown in FIG. 3 according to an exemplary embodiment of the present invention.

It the foregoing description, it is assumed that the distorted section is specified in advance depending on its length or time on the timeline bar T_bar3. For example, if the distorted section is specified on the timeline bar T_bar3 on the basis of any one of the length and time, the strength of distortion may be set constant. In other words, since the distorted section of the timeline bar T_bar3 is constant in pattern, the distorted section does not need to be changed in pattern. Therefore, the distorted section is distorted in the constant strength and pattern regardless of content.

In the coming years, users may easily enjoy very diverse and vast amount of content in quantities unknown heretofore. This diversity of content may make it difficult to enable a fine search only with the timeline bar T_bar3 on which the distorted sections DD, DD1 and DD2 are generated in the same pattern as shown in FIGS. 3 and 4A to 4C. In other words, with regards to the timeline bar T_bar3 on which the distorted sections DD, DD1 and DD2 with a constant pattern are generated, the distorted sections DD, DD1 and DD2 with the same pattern are generated for both 10-hour content and 10-minute content, making it difficult for the user to quickly and finely search content. In particular, a search section where the length is represented on the timeline bar T_bar3, may vary depending on the size of content. A 1-cm length on the timeline bar T_bar3 may represent 10-minute information for specific content (e.g., content with audio clips), but may represent 1-minute information for larger content (e.g., content with video clips).

Therefore, the presently claimed invention makes it possible to adjust the strength of distortion and the range of distorted section in various different ways so as to enable a fast and fine search for a variety of content.

Figure 5A:
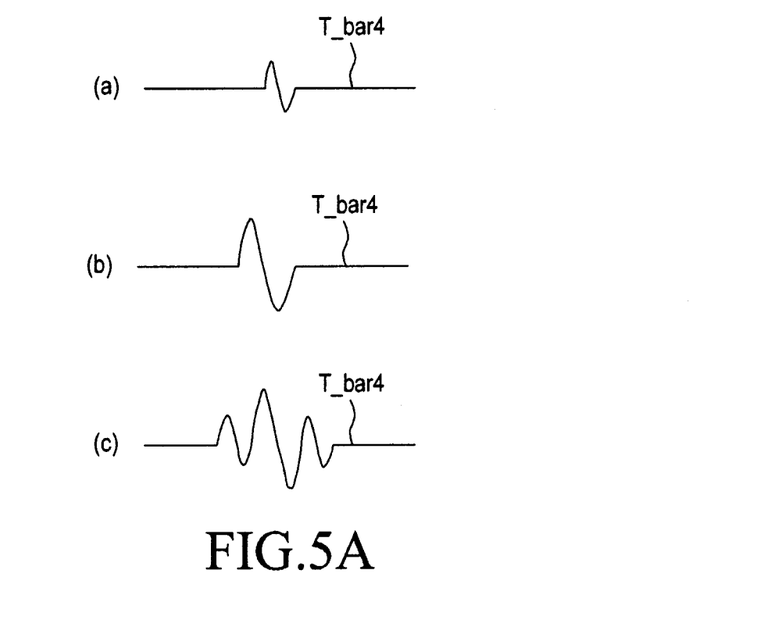
FIGS. 5A to 5E show a method of adjusting the strength of distortion and the range of a distorted section on the timeline bar shown in FIG. 3 according to an exemplary embodiment of the present invention.

In FIG. 5A, (a) represents low-strength distortion, (b) represents mid-strength distortion, and (c) represents high-strength distortion. As the distortion strength is higher, the length of a timeline bar T_bar4 in the distorted section is longer, making it possible to search the content more finely.

Depending on content, the strength of distortion may be automatically set, or may be specified by the user. When the distortion strength of content is automatically set, the strength may be automatically set depending on the size (e.g., the length, or the number of pieces) of content, at a predetermined ratio or using a predetermined algorithm. Not only the strength of distortion, but also the range of distorted section may be automatically set. The strength of distortion represents how finely the user may search content in the distorted section, and the range of distorted section represents a specific section in the entire section of content, which will be distorted.

According to an exemplary aspect of the present invention, when the strength of distortion and the range of distorted section are specified by the user, the strength of distortion may vary depending on the user's touch time and/or touch strength (e.g., touch pressure). For example, if the user first touches a specific position on the timeline bar T_bar4, the timeline bar T_bar4 is distorted at around the user-touched position as shown in (a). If the user keeps the touch, the strength of distortion and the range of distorted section may increase with the respectively increased touch time as shown in (b) and (c). Thereafter, if the user shifts or releases the touch, the strength of distortion and the range of distorted section, which have varied up to then, will be kept, and thereafter, the user may make a fine search. Although it is assumed herein that the strength of distortion and the range of distorted section vary depending on the touch time, the strength of distortion and the range of distorted section may vary depending on the touch strength, such as touch pressure. In addition, with a combination of the touch time and the touch strength, the range of distorted section may vary depending on the touch time, while the strength of distortion may vary depending on the touch strength.

For an event trigger based on the distortion, a delay touch may be used in which the user touches substantially the same position for a predetermined time. The performance may be minimized by setting a predetermined touch trigger time to '0', and the strength of distortion and the range of distorted section may increase with the touch time. Referring now to FIG. 5A, the proposed zigzag-type distortion includes a plurality of curves, and for the same X-axis, the real length of the nonlinear timeline is much longer than that of the conventional linear timeline. Therefore, the volume of content, which corresponds to the unit length of the timeline, is relatively small. For example, when the user shifts or drags the timeline bar with his or her fingertip by a predetermined length, the volume of content may vary relatively small. With use of the proposed nonlinear timeline based on this principle, the user may finely adjust or manipulate the content only with his or her fingertip. In the present invention, the distorted curves are defined as a focus area, and the linear portions are defined as a context area. A ratio of these areas may vary depending on the user's settings. In other words, the user may drag the touch in the context direction (which, for the purposes of this discussion) is in a direction of the conventional X-axis) and the focus direction (which, for the purposes of this discussion) is a direction of the distorted curves), making it possible to differentially adjust the content depending on the user's selection.

The event trigger may occur, when the user's touch occurs with a predetermined pressure or more, when the user makes a specific gesture, or when the user makes a double touch on substantially the same position.

Figure 5B:
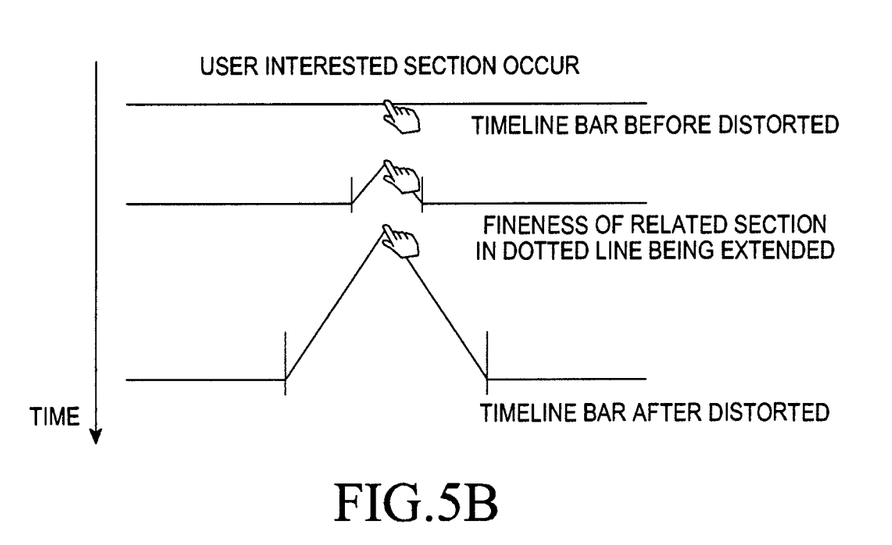

FIG. 5B shows a series of steps in which nonlinear distortions occur according to an exemplary embodiment of the present invention. It is shown that as time goes by (see a down arrow), the displayed timeline bar is distorted more and more. In this case the distortion is increased in size. The horizontal line represents a timeline bar. A user interested section may occur while a slider (not shown) shifts along the timeline bar. Then, the user will touch a specific position on the timeline bar within the section, triggering an event trigger.

Thereafter, the user makes a drag as an action continuing from the touch. The drag occurs to get away from the timeline bar, so the timeline bar in the user-touched position will be extended along the position of the drag.

In the step where the nonlinear distortion occurs, the timeline bar is extended or distorted to pass the position of the drag in a predetermined section. In the predetermined section, the timeline bar may be distorted in the form of broken lines passing the position of the drag. However, the present invention is not limited thereto, and many other different patterns including curves may be applied to the invention.

In the present invention, the strength of distortion and the range of distorted section may be adjusted in various ways to enable a fast and fine search for a variety of content.

As the current position of the touch-and-drag becomes increasingly farther away from the timeline bar, a fineness of the user interested section increases more and more. The width (or range) of the user interested section may also be set to increase according thereto. In the present invention, the user interested section may be set in advance, may vary during occurrence of distortion, and may vary in proportion to the drag getting away from the timeline bar.

When audio and video clips are played along the distorted timeline bar, they may be played, for example, at a speed that is slower than a normal speed in the user interested section according to its length, making it possible for the user to adjust the fineness in a variety of ways by setting his or her desired interested section.

The strength of distortion may be automatically set depending on the content, or may be specified by the user. When the strength of distortion is automatically set depending on the content, the strength of distortion may be automatically set depending on the size (e.g., the length, or the number of pieces) of content, at a predetermined ratio or using a predetermined algorithm. Not only the strength of distortion, but also the range of distorted section may be automatically set. The strength of distortion represents how finely the user may search content in the distorted section, and the range of distorted section represents a specific section in the entire section of content, which will be distorted.

Figure 5C:
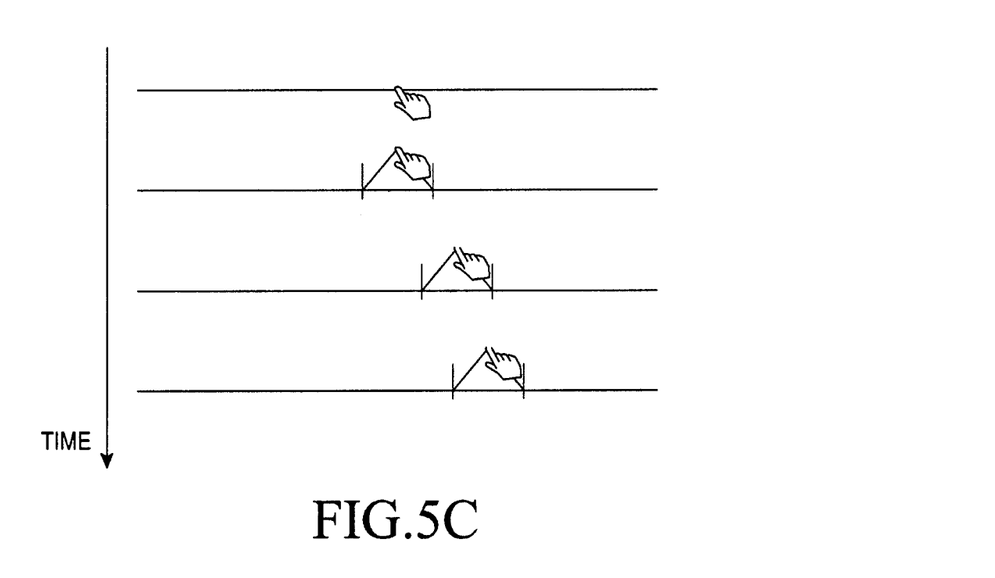

FIG. 5C shows a method in which a user sets or decides a fineness of his or her interested section and then adjusts the user interested section by horizontally shifting the user interested section. When the user touches the user interested section and horizontally shifts it, the user interested section may be shifted, with the width of the user interested section fixed.

Figure 5D:
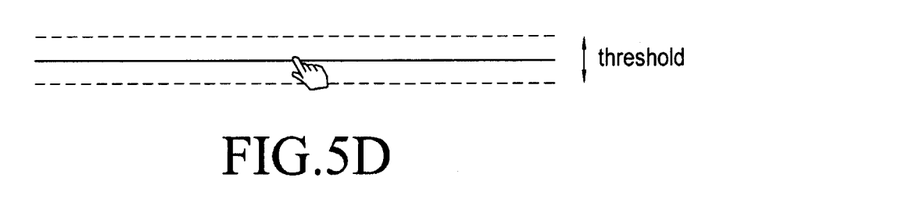

Referring now to FIG. 5D, as an example of an event trigger, a predetermined threshold is set around the timeline bar, and distortion occurs when the user touches the timeline bar and drags it out of the threshold area.

The solid line represents the timeline bar, and the dotted lines represent a threshold based on which it is determined whether the set distortion occurs.

When a timeline slider is placed to shift left and right, its shift in the left/right direction is a simple shift on the timeline bar, and if the timeline slider is spaced apart from the timeline bar by a predetermined length or more, it may be considered a change in fineness. The phrase "distance from a timeline bar" as used herein may refer to the shortest distance (or vertical distance) from a point to a straight line or a curve, as defined in the general mathematics.

The present invention provides at least the following advantageous effects that are unknown and non-obvious. When the user attempts to horizontally shift the timeline slider on the timeline bar, a change in the timeline bar (e.g., dynamic distortion) should not occur, contrary to the attempt. In order to clearly distinguish the shift on the timeline bar from the change in the timeline bar (e.g., dynamic distortion), a specific area is considered as a trigger area, and a change mode is active only when the timeline slider is spaced apart from the timeline bar by a predetermined value.

Figure 5E:
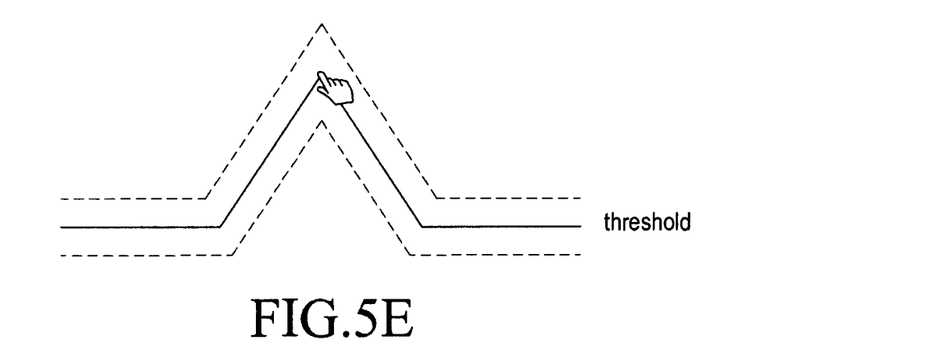

The present invention is characterized to dynamically distort the timeline bar and keeps the dynamic distortion. As shown in FIG. 5E, if the timeline slider is spaced apart from the timeline bar by a predetermined length or more even after the distortion, it is possible to re-distort the timeline bar, considering the separation as a change in fineness.

In other words, if a re-touch is shifted back to the original position, it will get out of the threshold, causing a change in the timeline bar, and if the re-touch is shifted within a reset threshold, a fineness of the timeline bar enables a shift of the timeline slider, typically but not necessarily back to its original scale.

In the presently claimed invention, if there are top and bottom areas that can be spaced apart from the timeline bar as described above, a resolution of the timeline bar may be adjusted by making a drag gesture in these areas, enabling more fine scanning and browsing. In particular, the user may adjust the fineness (or resolution) of the timeline bar without delay touch, improving work efficiency. Moreover, the brightness, color, etc. of the timeline bar can be adjusted. IT is also within the spirit and scope of the claimed invention that a sound can also be output while the timeline bar is being adjusted. In addition, the user may play content after setting the fineness in advance, contributing to an increase in utilization of learning content. With use of the triangular timeline bar which is simpler than the conventional zigzag timeline bar, the user may easily recognize the fineness and conveniently drag the timeline bar.

The artisan understand and appreciates that other shapes can be used, including substantially circular, wherein a full revolution could return the timeline to its original image, In particular, when the timeline bar is randomly distorted in the form of zigzag, its extension is limited due to the characteristics of the timeline bar that is placed adjacent to the bezel. However, in the present invention, free extensions are possible because the extension may be made only in a user's intended direction.

In the presently claimed invention, a section where there is important content may be extended, and a drag may be made slowly in the section, and this may be used for a scroll bar of document, making it possible to store the importance of each section of the document and to easily deliver it to other people.

Figure 6:
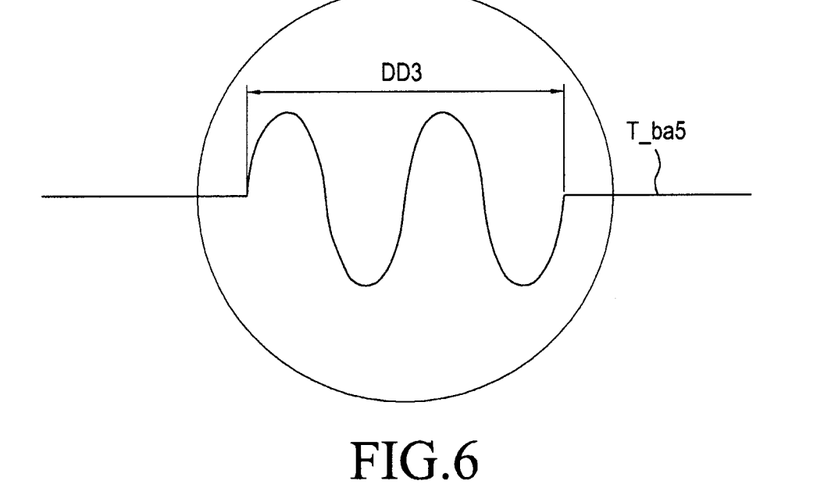
FIG. 6 shows an enlarged distorted section according to an exemplary embodiment of the present invention.
Figure 7A:
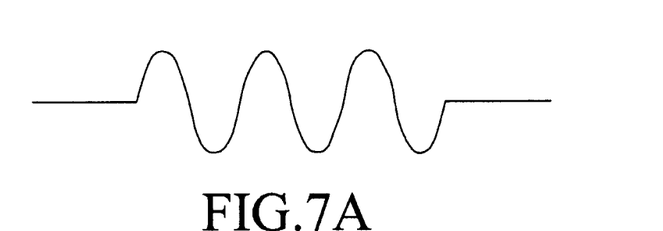
FIGS. 7A to 7H show distorted timelines in various different forms according to an exemplary embodiment of the present invention.
Figure 7B:
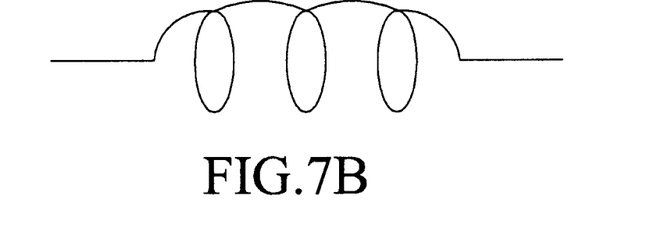
Figure 7C:
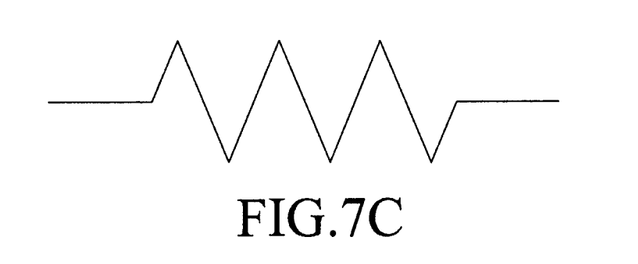
Figure 7D:
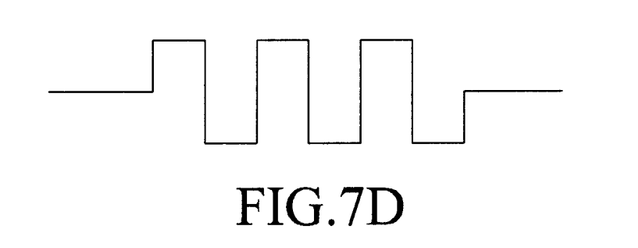
Figure 7E:
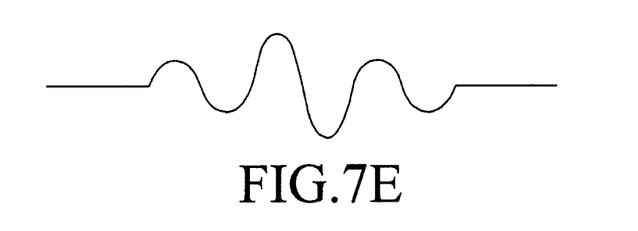
Figure 7F:
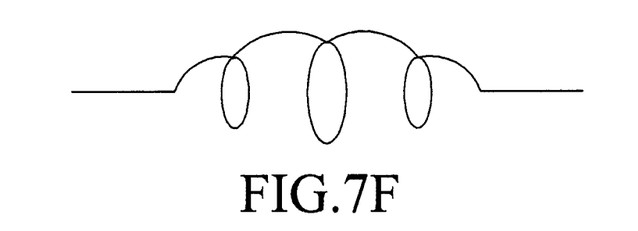
Figure 7G:
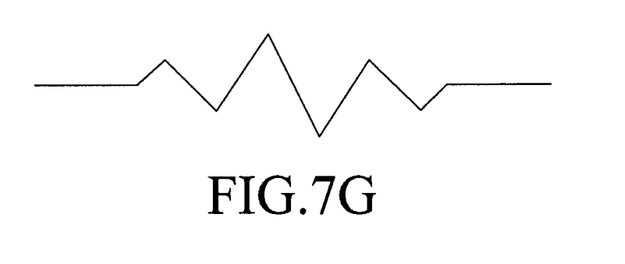
Figure 7H:
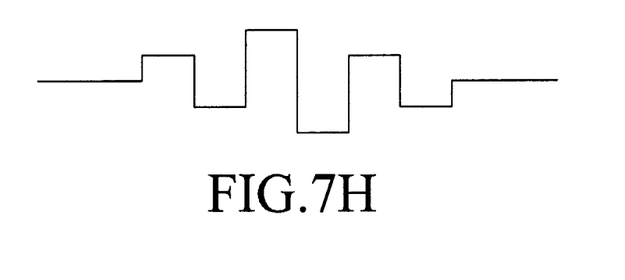

FIG. 6 shows an enlarged distorted section according to an exemplary embodiment of the present invention.

As described above, when the range of distorted section and/or the strength of distortion vary, the timeline bar T_bar4 in the distorted section may be dense (or fine). This may bypass the range or strength of the distorted section of the invention to allow the user to easily make a fine search even at a low resolution. Accordingly, in FIG. 6, when compared to other sections, the distorted section DD3 may be relatively enlarged and displayed. Because the distorted section DD3 may be relatively enlarged compared to other sections, the user may easily select or touch the distorted section DD3 on a timeline bar T_bar5 even with his or her large fingertip, enabling more fine search. The extension of the distorted section DD3 may be achieved upon each occurrence of distortion, or may be achieved only when the strength of distortion is greater than or equal to a predetermined reference value.

FIGS. 7A to 7H show distorted timelines in various different forms according to an exemplary embodiment of the present invention. All of the distorted timelines are shown in various different forms, as shown in FIGS. 7A to 7D, have a longer length than the conventional linear timeline in a specific area, making it possible for the user to finely control video clips with his or her fingertip, especially with a touch gesture. The distorted timeline should be visually, audibly, or even tactilely distinguishable from its original linear timeline, to remove the ambiguity that the user may suffer from in recognizing the distorted section.

Referring now to FIGS. 7E to 7H, the strength of distortion is lower as the distorted point is farther away from the starting point of the distortion, minimizing the heterogeneity with the existing linear timeline bar.

The proposed timeline-based content control method based on the foregoing principles of the present invention will be described with reference to accompanying drawings.

Figure 8:
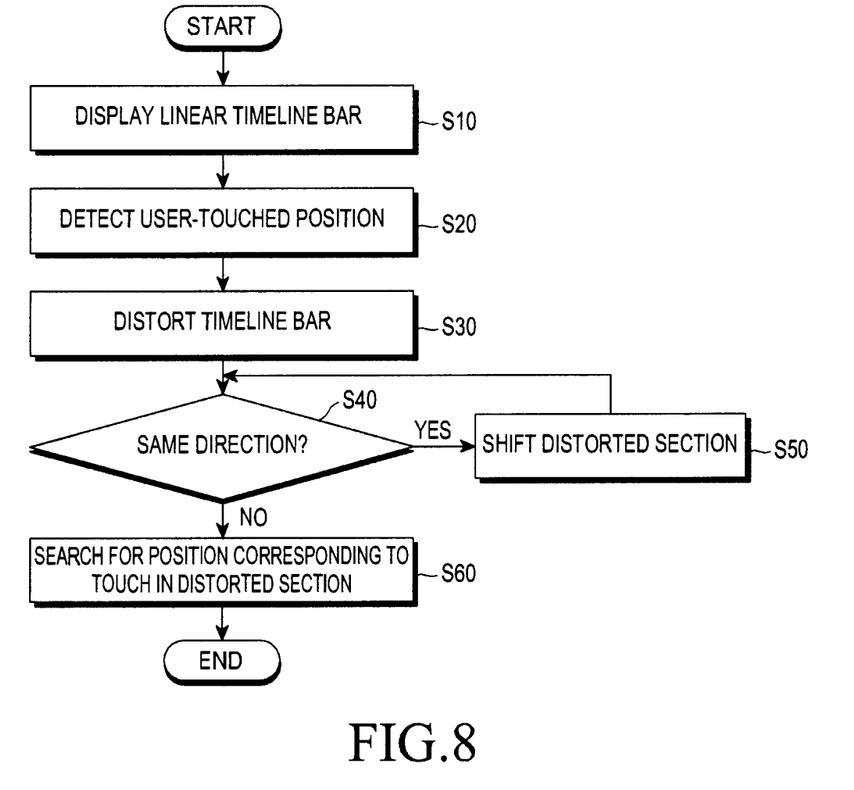
FIG. 8 shows a timeline-based content control method according to an exemplary embodiment of the present invention.

FIG. 8 shows a timeline-based content control method according to an exemplary embodiment of the present invention.

Referring now to FIG. 8, in the timeline-based content control method, a linear timeline bar is generated and displayed on a touchscreen in step S10. Thereafter, if a user's touch is detected on the timeline bar, the user touched position is determined in step S20. If the user touched position is determined, a specified section of the timeline bar is distorted at around the user touched position in step S30. The range of the distorted section and the strength of distortion may vary, as described above. If the user touches substantially the same position on the timeline bar for a predetermined time or more, the timeline bar may be distorted starting at the position. The technical meanings of distortion of the timeline bar and a definition thereof have been described above. For example, the distortion may be classified into curved distortion including one or more curves, and broken-line distortion in which a plurality of broken linear timeline bars are connected at a specific angle. Particularly, in the present invention, the strength of distortion may be set after the generation of the timeline.

Thereafter, it is determined in step S40 whether the user's drag direction is the same as the direction of the linear timeline bar. If the user's drag direction is the same as the direction of the linear timeline bar, a distorted section is shifted along the drag direction in step S50. Thereafter, the user's drag direction is determined again in step S40.

However, if the user's drag direction is not sensed as being in the same as the direction of the linear timeline bar, a position corresponding to the user's touch is searched for in the distorted section in step S60. The term 'search' may be used in various different meanings depending on the content. For example, in the case of video, video clips corresponding to the position on the timeline bar may be displayed. In the case of audio, voice information of audio clips corresponding to the position may be output.

To accomplish the above or other objectives, the present invention also provides a timeline-based content control apparatus.

Figure 9:
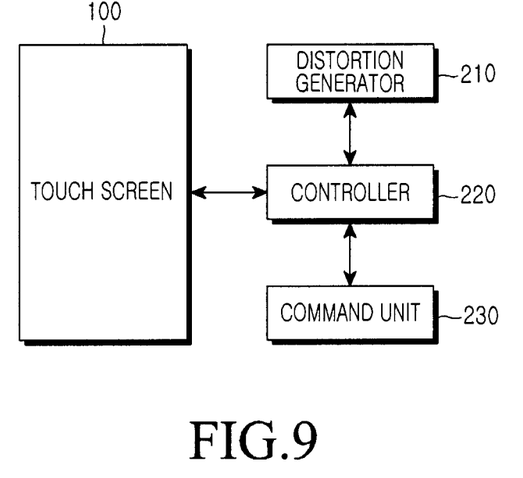
FIG. 9 is a block diagram of a timeline-based content control apparatus according to an exemplary embodiment of the present invention.

FIG. 9 is a block diagram of a timeline-based content control apparatus according to an exemplary embodiment of the present invention.

Referring now to FIG. 9, the timeline-based content control apparatus includes a distortion generator 210, a controller 220, and a command unit 230. The distortion generator 210 generates a nonlinear distortion in a specific section on the timeline bar depending on one or more sensed events. The controller 220, which is a processor or microprocessor comprising hardware, changes a distorted section on the timeline bar or shifts the timeline slier depending on the user's selection gesture corresponding to the shape of the timeline bar, and controls a touch screen 100. The command unit 230 generates a content control signal depending on the shift of the timeline slider on the timeline bar. The apparatus, can be, for example, a mobile phone, tablet computer, portable communication terminal, Personal Digital Assistance, notebook or desktop computer, virtually any electronic device with a touchscreen and a microprocessor configured for a timeline bar operation to control operation of an item.

The nonlinear distorted timeline may be classified into a curved timeline including one or more curves, and/or a broken-line timeline in which two or more timelines are connected at a specific angle. A description thereof has been made above. In an exemplary embodiment of the present invention, the event may be a touch event occurring on the touch screen 100, and examples of the touch event have been described above.

Examples of the forms of a timeline, the generated events, and shift speeds of a timeline bar have been described above.

The proposed timeline-based content control method and apparatus generates dynamic distortion of a timeline bar displayed on a touch display, and the content may be video clips containing visual information and/or audio clips containing voice information. Therefore, the proposed timeline-based content control method and apparatus may be used as a method and apparatus for controlling video clips and/or audio clips. The rate, speed, beginning, fast forwarding, rewinding, etc., are, for example, adjustable by operation of a slider or movement of a finger or stylus along the timeline bar, and can be finely and/or even coarsely adjusted in a distorted area of the timeline bar, the distorted area can be a nonlinear portion of control.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Under no circumstances is a broadest reasonable interpretation of the appended claims to include a non-statutory interpretation such as a series of mental acts or manual steps, as such a non-statutory interpretation is inconsistent with the invention disclosed by the present specification.

The proposed timeline-based content control method may be implemented in computer-readable codes recorded in a computer-readable recording medium. The computer-readable recording medium includes any kind of recording devices in which data that can be read by a computer system is stored. Typical examples of the recording medium may include Read Only Memory (ROM), Random Access Memory (RAM), Compact Disc-Read Only Memory (CD-ROM), magnetic tapes, floppy disks, optical data storage devices, etc., and may also include transmission of carrier waves (e.g., transmission over the Internet). As for the computer-readable recording medium, computer-readable codes are stored and executed in the computer systems connected over the network in a distributed manner.

As is apparent from the foregoing description, the proposed timeline-based content control method and apparatus using dynamic distortion of a timeline bar, and a method and apparatus for controlling video and audio clips using the same, may generate a nonlinear long timeline in various patterns, which has a longer length than the existing linear timeline, by dynamically distorting a user-desired search section on the linear timeline, making it possible to enable fine manipulation on small devices with a small screen, such as mobile communication terminals, video players, PDA's, tablet computers, etc., and enable effective content control and manipulation of content to be output, which may include but is not limited to being displayed, redisplayed, or currently being displayed in a specified section on large devices with a large screen. The invention may comprise an editing tool, where one can manipulate content that is subsequently saved, or output to another device or devices, in addition to or in lieu of being output on a touchscreen. For example, a mobile communication terminal may function as an editing tool. In addition, the range of distorted section and the strength of distortion may be dynamically adjusted by making a touch for a predetermined time or more, enabling variable and fine adjustment of the timeline bar depending on the user's selection. Moreover, as for the proposed manipulation, the novel timeline is substantially the same in shape as the ordinary timeline, so the user may easily intuitively recognize the timeline. The proposed structure may be achieved by machine executable code read stored on a machine readable medium and executed by a processor. Moreover "user touch" does not have to be actual touch and includes contact by a stylus and in either case shall be understood to be positioning substantially within proximity to the surface of the touchscreen to be detected as touch by the touchscreen.

While the invention has been shown and described with reference to certain exemplary embodiments thereof, it will be understood by those skilled in the art that various changes in form and details may be made therein without departing from the spirit and scope of the invention as defined by the appended claims and their equivalents. For example, it is also within the spirit and scope of the invention that a predetermined amount of pressure sensed as being exerted on the touchscreen can be used to vary the nonlinear distortion alone or in conjunction with a time in which the detected touch remains at the same position of the screen. In such a case there can be a pressure threshold for a particular time, therefore using two items (pressure and time) as a basis for varying the range of nonlinear distortion and two thresholds. Moreover, the timeline according to the present invention can be dynamically generated and further modified based on sensed contact on the display, it is also within the spirit and scope of the invention that the different timeline bars can retrieved from storage.

What is claimed is:

1. A method for controlling an output of content, comprising:
    displaying a timeline bar on a touchscreen comprising a linear shape and disposed along a linear axis and configured to enable searching and selection of a playback position in the content;
    in response to detecting, via the touchscreen, a touch on a point of the timeline bar, distorting the linear shape of a predetermined section of the timeline bar centered on the point by a predetermined distance to be a form of at least one of zigzag curve, spiral, pulse, square-wave, sinusoidal wave, saw-tooth, triangle, rectangular wave and spring and including an additional length for selecting the playback position with an increased precision;
    if a drag input is detected within the distorted predetermined section including the form of the at least one of the zigzag curve, the spiral, the pulse, the square-wave, the sinusoidal wave, the saw-tooth, the triangle, the rectangular wave and the spring moving along the linear axis, shifting the predetermined section along the linear axis; and
    if the drag input is detected within the distorted predetermined section moving along the at least one of the zigzag curve, the spiral, the pulse, the square-wave, the sinusoidal wave, the saw-tooth, the triangle, the rectangular wave and the spring, identifying the playback position along the at least one of the zigzag curve, the spiral, the pulse, the square-wave, the sinusoidal wave, the sawtooth, the triangle, the rectangular wave and the spring using the increased precision.

2. The method of claim 1, wherein
    the playback position is moved along the at least one of the zigzag curve, the spiral, the pulse, the square-wave, the sinusoidal wave, the saw-tooth, the triangle, the rectangular wave and the spring, respectively, when the drag input is detected moving along a direction other than the linear axis.

3. The method of claim 1, wherein the form further comprises a form of a plurality of broken lines.

4. The method of claim 1, wherein the predetermined distance is set by length.

5. The method of claim 1, wherein the predetermined distance is set by time.

6. The method of claim 1, further comprising distorting the linear shape of the predetermined section when the detected touch remains at a same position of the touchscreen for a predetermined duration or longer.

7. The method of claim 6, further comprising increasing nonlinear distortion of the predetermined section on the timeline bar based on a time that the detected touch remains at the same position of the touchscreen.

8. The method of claim 6, wherein the distorting comprises varying a range of the distorted predetermined section and a strength of the distortion depending on the duration that the detected touch remains at the same position of the touchscreen.

9. The method of claim 6, wherein the distorting comprises varying a range of the distorted predetermined section and a strength of the distortion on the timeline bar according to a time for which the detected touch remains at the same position of the touchscreen.

10. The method of claim 1, further comprising nonlinearly distorting the predetermined section on the timeline bar upon occurrence of a predetermined event trigger.

11. The method of claim 10, wherein the predetermined event trigger occurs when the detected touch includes a predetermined pressure or more, when a specific gesture is detected, or when a double touch is detected on a substantially same position of the touchscreen.

12. The method of claim 1, further comprising varying a strength of the distorting according to a size of content represented by a length of the timeline bar.

13. The method of claim 1, wherein shifting the predetermined section is executed such that portions of the timeline bar that are not nonlinearly distorted are nonlinearly distorted as they enter the predetermined section, and other portions of the timeline bar that are nonlinearly distorted are undistorted as they exit the predetermined section.

14. The method of claim 1, wherein the content comprises at least one of:
consecutive data of volume, brightness and chroma; a video clip; and an audio clip.

15. The method of claim 1, further comprising:
setting a threshold area above and below the timeline bar;
in response to detecting the touch on the point of the timeline bar, detecting if the touch is moved beyond the threshold area; and
when the touch is moved beyond the threshold area, distorting the linear shape of the predetermined section in a direction in which the touch is moved, and altering the threshold area to surround the timeline bar including the distorted shape of the predetermined section.

16. A timeline-based content control apparatus, comprising:
a touchscreen configured to display a timeline bar comprising a linear shape disposed along a linear axis for searching and selection of a playback position in content when the touchscreen detects a touch on point of the timeline bar; and
a controller configured to:
in response to detecting a touch on a point of the timeline bar, distort the linear shape of a predetermined section of the displayed timeline bar centered on the point by a predetermined distance to be a form of at least one of zigzag curve, spiral, pulse, square-wave, sinusoidal wave, saw-tooth, triangle, rectangular wave and spring including an additional length for selecting the playback position with increased precision,
if a drag input is detected within the distorted predetermined section the at least one of the zigzag curve, the spiral, the pulse, the square-wave, the sinusoidal wave, the saw-tooth, the triangle, the rectangular wave and the spring moving along the linear axis, shift the distorted predetermined section along the linear axis, and
if the drag input is detected moving along the at least one of the zigzag curve, the spiral, the pulse, the square-wave, the sinusoidal wave, the saw-tooth, the triangle, the rectangular wave and the spring, identify the playback position along the at least one of the zigzag curve, the spiral, the pulse, the square-wave, the sinusoidal wave, the saw-tooth, the triangle, the rectangular wave and the spring distorted using the increased precision.

17. The apparatus according to claim 16, wherein the content comprises at least one of: consecutive data of volume, brightness and chroma, a video clip; and an audio clip.

18. The apparatus of claim 17, wherein the playback position is moved along the at least one of the zigzag curve, the spiral, the pulse, the square-wave, the sinusoidal wave, the saw-tooth, the triangle, the rectangular wave and the spring, respectively, when the drag input is detected moving along a direction other than the linear axis.

19. The apparatus of claim 18, wherein an amount of the distorting of the linear shape increases according to a time that the detected touch remains at a same position of the touchscreen.

20. The apparatus of claim 18, wherein a range of the predetermined section and a strength of the distorting vary according to a duration that the detected touch remains at a same position of the touchscreen.

* * * * *

UNITED STATES PATENT AND TRADEMARK OFFICE
CERTIFICATE OF CORRECTION

| | |
|---|---|
| PATENT NO. | : 9,281,010 B2 |
| APPLICATION NO. | : 13/483405 |
| DATED | : March 8, 2016 |
| INVENTOR(S) | : Sung-Jae Hwang |

It is certified that error appears in the above-identified patent and that said Letters Patent is hereby corrected as shown below:

Claims

Column 16, Claim 16, Line 34 should read as follows:
--...the spring using the...--

Signed and Sealed this
Third Day of May, 2016

Michelle K. Lee
*Director of the United States Patent and Trademark Office*